Sept. 22, 1953     D. SUSSIN ET AL     2,653,246
X-RAY APPARATUS
Filed May 11, 1950     3 Sheets-Sheet 1
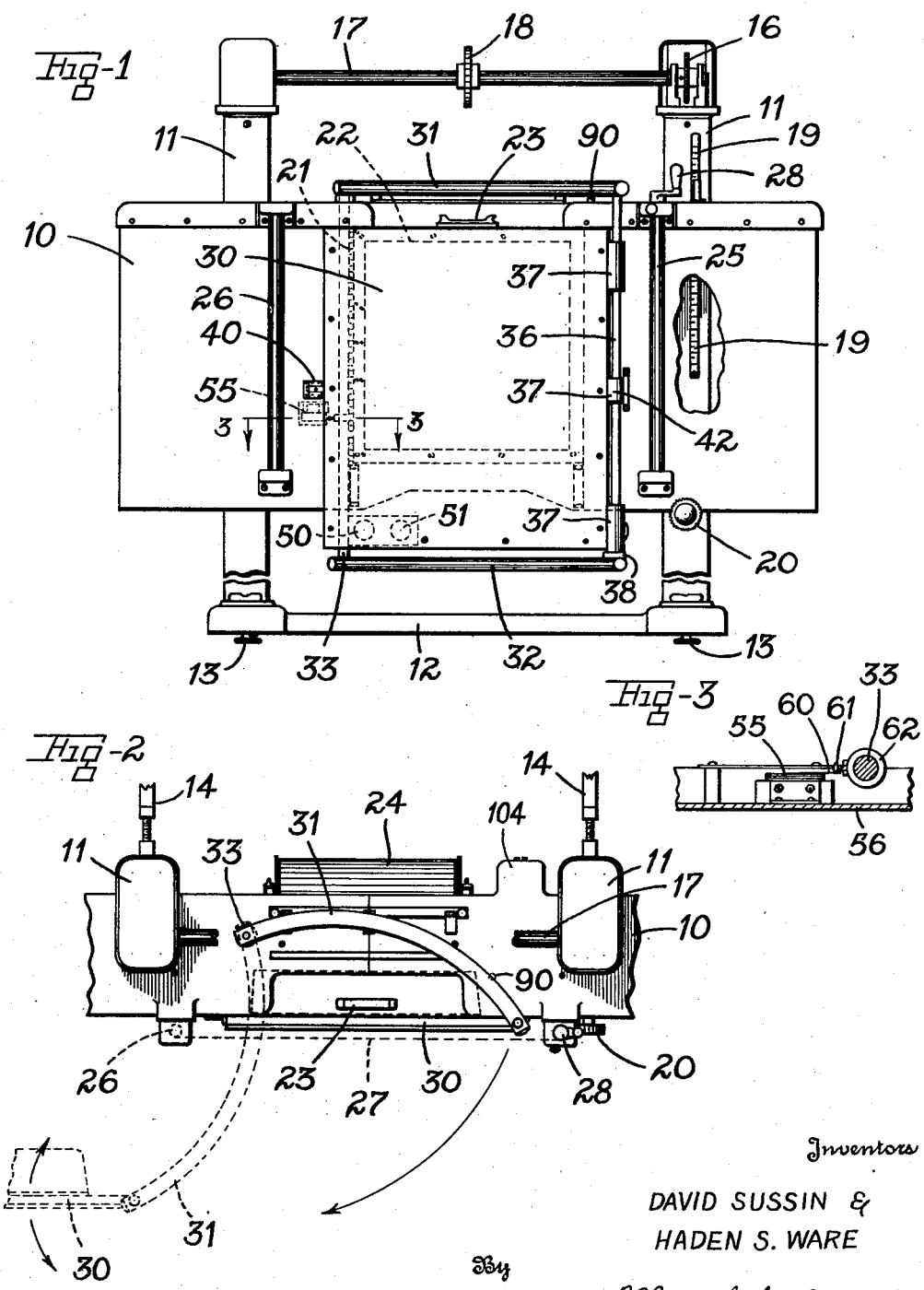
Inventors
DAVID SUSSIN &
HADEN S. WARE
Marechal & Biebel
ATTORNEYS

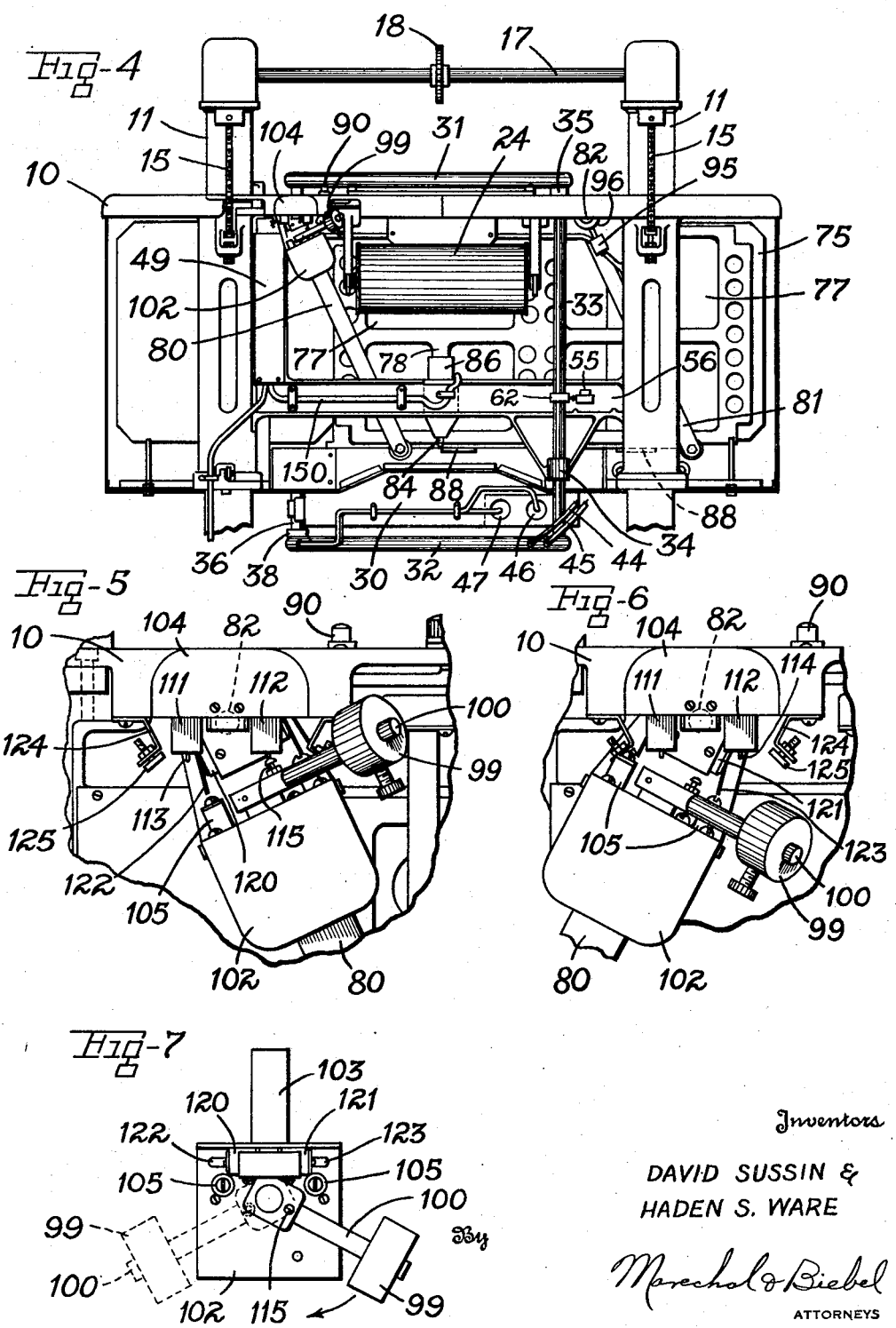

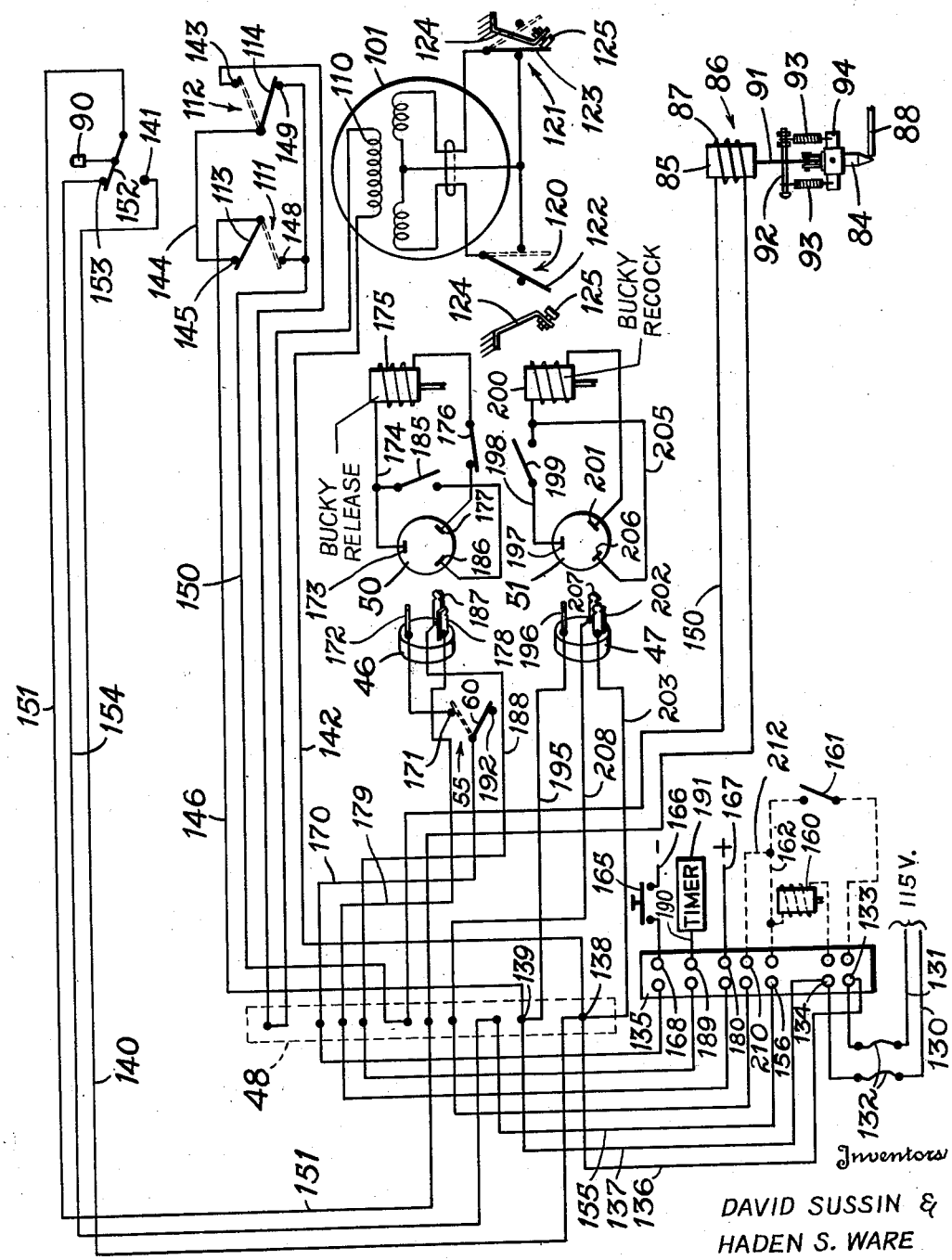

Patented Sept. 22, 1953

2,653,246

UNITED STATES PATENT OFFICE 2,653,246

X-RAY APPARATUS

David Sussin, South Fort Mitchell, and Haden S. Ware, Fort Mitchell, Ky., assignors to Keleket X-Ray Corporation, Cincinnati, Ohio, a corporation of Ohio Application May 11, 1950, Serial No. 161,366

12 Claims. (Cl. 250—62)

This invention relates to cassette changers for use in radiography.

The invention has particular relation to devices of this character which are adapted for use in stereoradiography as well as in making single radiographs and wherein the cassette holder containing a plurality of cassettes is mounted to swing with a pendulum motion between two operative positions for successively aligning the cassettes therein in the proper exposure position with respect to the patient to take successive radiographs, with the stereoscopic effect being obtained by shifting the position of the X-ray tube between exposures to change the angular relation of the X-ray beam and the patient in the resulting two pictures of the stereoscopic pair. It will be apparent, therefore, that during stereoradiography there is an interval between the two exposures, and it is desirable that this interval be short, both to assure as nearly as possible that the same internal conditions obtain in both pictures and also to minimize the time during which the patient is required to remain motionless. In addition, it is desirable that the shifting movement of the cassette holder be effected with minimum shock in order to assure that the cassette be motionless during exposure.

The present invention provides a pendulum type cassette changer in which this desirable smooth and rapid shifting of the cassette holder is facilitated by means of a compensating weight carried by the cassette holder and operated by a motor which shifts the effective position of this weight after each swing of the cassette holder. Further assurance of this desired operation of the device is provided by an arrangement of control switches operated by the cassette holder and compensating weight which cooperate after shifting of the cassette holder to reset the weight in the proper operating position for the return swing of the cassette holder and which also are effective to prevent movement of the cassette holder except when this weight is in proper position.

The invention also provides for improved operating results with cassette changers of this character by a simple and effective mounting arrangement for the bucky diaphragm. Instead of requiring physical removal of the bucky when its use is not desired, the bucky is mounted by means of hinged arms so arranged that it can be quickly shifted from its operating position to a laterally removed inoperative position and vice versa without overbalancing the device as a whole and without interfering with the electrical connections to the bucky. In addition, this mounting arrangement of the bucky permits the use of a compression band when desired either with or without the bucky to aid in holding the patient properly motionless.

It is accordingly one of the principal objects of the present invention to provide a pendulum type cassette changer which is rapid and smooth in operation, which includes automatic controls assuring proper action of the cassette holder and preventing premature motion thereof, and which also includes a simple mounting for the bucky so that the latter can be quickly and easily moved into and out of operating position as desired without affecting the electrical connections thereto or the operation of other parts of the device.

Another object is to provide a pendulum type cassette changer wherein smooth and rapid shifting of the cassette holder from one exposure position to the other is effected by means of a motor driven compensating weight which is shifted following each swing of the cassette holder to the proper position for the return swing of the holder, and wherein controls operated by the cassette holder and the compensating weight prevent premature movement of either member.

It is also an object of the invention to provide a pendulum type changer wherein the bucky is mounted on the device by means of swinging arms which permit the bucky to be shifted between its operative and inoperative positions as desired without interfering with the compression band or other parts of the device and wherein operation of the bucky is automatically prevented by movement thereof to its inoperative position without otherwise interfering with the electrical connections thereto.

Other objects and advantages of the invention will be apparent from the following description, the accompanying drawings and the appended claims.

In the drawings:

Fig. 1 is a front elevation view, partly broken away, showing a cassette changer in accordance with the operation and with the bucky in operative position;

Fig. 2 is a fragmentary top view showing the structure and operation of the mounting for the bucky;

Fig. 3 is a fragmentary section on the line 3—3 of Fig. 1 showing the cutout switch for the bucky;

Fig. 4 is a fragmentary rear elevational view of the cassette changer;

Figs. 5 and 6 are fragmentary views on an enlarged scale showing successive positions of the compensating weight for the cassette holder and its associated parts;

Fig. 7 is a fragmentary top view of the compensating weight and its associated parts; and Fig. 8 is a wiring diagram.

Referring to the drawings, which illustrate a preferred embodiment of the invention, the carriage 10 which forms the main frame of the cassette changer is supported for vertical movement by a pair of upright columns 11 having a base 12 provided with leveling screws 13 and adapted to be secured to the wall by a pair of wall jacks indicated fragmentarily at 14. The carriage 10 is supported by chains 15 and sprockets 16 secured to a shaft 17 extending between the tops of the columns 11, and these columns are hollow to house suitable counterweights (not shown) at the other ends of the chains 15. The shaft 17 may carry a sprocket or pulley 18 for driving a corresponding sprocket or pulley on the tube stand to effect raising or lowering of the tube head in accordance with the vertical adjustment of the carriage 10. A scale 19 is provided for indicating the vertical position of the carriage 10, and the knob 20 operates a lock or brake for holding the carriage in adjusted position on columns 11.

The exposure position for the patient is defined by the front plate 22 of the carriage, which is hinged to the carriage at 21 below the chin rest 23 to provide ready access to the interior of the carriage for loading and unloading cassettes. A roll of paper 24 may be provided as shown to supply a covering sheet for plate 22 for sanitary purposes. The compression band rolls 25 and 26 are mounted on the front of the carriage at either side of the plate 22 to support the compression band 27 indicated in dotted lines in Fig. 2 for holding the patient at the exposure position, the right-hand compression band rolls 25 being shown as provided with a crank handle 28.

The bucky assembly includes a casing 30 which houses a bucky diaphragm of the usual construction and its operating switches and magnets. The casing 30 is mounted for swinging movement between the operating position aligned with plate 22 as shown in full lines in Figs. 1 and 2 and a laterally removed inoperative position indicated in dotted lines in Fig. 2. The mounting for casing 30 includes a pair of curved arms 31 and 32 hinged to the carriage by means of a shaft 33 journaled in a boss 34 at the back of the carriage and provided with a thrust bearing 35 at the top of the carriage. The shaft 33 is located adjacent one side of the exposure position of the device, and the arms 31 and 32 are pinned to shaft 33 and extend beyond the opposite side of the exposure position. The outer ends of these arms are hinged to the casing 30 by means of a shaft 36 journaled in swivel brackets 37 secured to the edge of the casing, and a thrust bearing 38 is provided between the lowermost bracket 37 and the arm 32.

This arrangement of swinging arms supports the bucky casing in such manner as to permit the casing to be swung from its operating position to an inoperative position spaced completely away from the exposure position, as indicated in dotted lines in Fig. 2, thus permitting use of the device without the bucky while at the same time supporting the bucky for quick movement into operating position when desired. This arrangement has the further advantage of permitting free use of the compression band 27 both with and without the bucky, since when the bucky is in operating position, the band 27 can be drawn across the front of it as indicated in Fig. 2, and when the bucky is swung away, it is beyond the left-hand compression band roll 26 and thus is out of the way of the compression band itself. A latch 40 on the left hand edge of casing 30 cooperates with a retainer on the carriage to hold the casing in operating position, and an additional catch and retainer 42 are provided at the opposite edge of the casing, the arrangement being such that the catch 42 is engaged before the latch 40 and vice versa.

The electrical circuits for operating the bucky are provided by a pair of cables 44 and 45 having plugs 46 and 47 at one end and having their other ends connected to a terminal strip 48 (Fig. 8) located in the carriage behind the cover plate 49. Sockets 50 and 51 at the back of the casing 30 are adapted to receive these plugs 46 and 47, and it will be noted that the cables are mounted within the hollow lower arm 32 and are thus out of the way in both positions of the bucky. Also, Fig. 4 shows how the cables enter the arm 32 adjacent the shaft 33 and emerge adjacent the shaft 36, thus assuring minimum flexing of the cables as the bucky is swung into and out of its operating position.

The cable 44 is connected with a cutout switch 55 (Figs. 3 and 8) for preventing operation of the bucky when the casing is in inoperative position. This switch is mounted on the web 56 which extends across the back of carriage 10, and its switch arm 60 (Fig. 3) extends into a path of a bolt 61 carried by a collar 62 secured to shaft 33. The collar 62 is so mounted on shaft 33 that when the casing 30 is in operating position, the bolt 61 will engage arm 60 to move it to the dotted position shown in Fig. 8, and when the casing 30 is swung out of operating position, the bolt 61 rotates with shaft 33 and thus releases the switch arm 60 for return to the position shown in full lines in Fig. 8.

The cassette holder of the cassette changer is indicated at 75. It comprises a generally rectangular frame forming a pair of side by side compartments for receiving the two cassettes indicated at 77, and the upper portion of each compartment is open, having no central strut such as is shown at 78 (Fig. 4), to provide for operation of the device with a phototiming device operating through the cassette and holder if desired. A pair of parallel arms 80 and 81 forms the pendulum mounting for the cassette holder, these arms having their upper ends pivoted to the carriage 10 on the horizontal pivots 82 and their lower ends pivoted to the lower edge of the cassette holder. The latter can thus swing with a pendulum motion between the operating position shown in Fig. 4 and a similar operating position on the opposite side of center with respect to the carriage, as indicated fragmentarily in Fig. 6, to position the cassettes 77 successively in alignment with the exposure position of the device. The carriage is provided with adequate lead shielding at either side of the front plate 22 to protect the cassettes from accidental exposure when not in exposure position.

The cassette holder is releasably held in each of its two operating positions by a plunger 84 depending from the armature 85 of a trip magnet 86 having an operating coil 87, the plunger 84 cooperating with catch plates 88 on the lower edge of the cassette holder to form a latch and the coil being energized through a push button switch 90 at the top of carriage 10. As shown in Fig. 8, the plunger 84 and armature 85 are connected by a link 91 through which extends a rod 92 supporting one end of each of a pair of springs 93 having their opposite ends anchored to a bracket 94. Thus when the coil 87 is energized by depression of the push button 90, the plunger 84 will be raised to release the adjacent catch plate 80 and permit the cassette holder to swing towards its other operating position.

In order to assure that the cassette holder swing all the way from one operating position to the other, the arms 80 and 81 are provided with compensating weights 95 and 99. The compensating weight 95 is carried by an arm and collar 96 on the pivot 82 for arm 81, and it is adjustable both radially and angularly with respect to this pivot to permit adjustment of the swing of cassette holder 75 so that it will compensate for friction equally in both directions. Adjustment of weight 95 is done when initially setting up the device, and thereafter it is fixed in its proper adjusted position.

The compensating weight 99 is provided on the arm 80 and is caused to shift from one side of center of the pivot 82 to the other after each swinging of the cassette holder to provide an off-center load on the cassette holder during each swing. The weight 99 is carried by an arm 100 driven by a small reversible electric motor 101 (Fig. 8) having a cover 102, the motor and other parts of this compensating weight assembly being carried by a bracket 103 mounted for swinging movement with arm 80 on axis 82 below a covering boss 104 on carriage 10. The weight 99 operates between two limit positions defined by bumpers 105 mounted on top of the cover 102 in the path of arm 100.

The motor 101 is actuated in timed relation with the swinging movement of the cassette holder to assure proper resetting of the weight 99 after each operation of the cassette holder, and provision is also made for preventing the cassette holder from moving until the weight 99 is reset. The primary coil 110 of the motor is energized through one of a pair of microswitches 111 and 112 mounted on the carriage 10 just above the compensating weight assembly as shown in Figs. 5 and 6. The switch arms 113 and 114 of these switches are adapted to be engaged by a bolt 115 mounted in the upper side of the weight arm 100, and the normal position of each of these switch arms when out of engagement with bolt 115 is as shown in Fig. 8 in full lines for arm 113 and dotted lines for arm 114.

An additional pair of microswitches 120 and 121 is carried by the bracket 103, and these switches control the direction of rotation of the motor 101. Thus when both switches are open, which is their normal condition, the motor circuits will be open and the motor will be shut off. Closing of the switch 120 sets the motor for counterclockwise rotation as viewed in Fig. 7, when current is supplied to its primary coil 110, and closing of switch 121 sets the motor for clockwise rotation. The actuating arms 122 and 123 of the switches are adapted to be alternately contacted by abutments on the carriage as the cassette holder swings, each abutment comprising a bracket 124 and bolt 125 having its head positioned in the path of the adjacent switch arm 122 or 123. The bolts 125 can be readily adjusted to assure that closing of one or the other of the switches 120 and 121 will occur just as the cassette holder reaches one or the other of its two operating positions.

The wiring diagram in Fig. 8 shows the cooperating action of these several switches in coordinating shifting movement of the compensating weight 99 with the swinging movement of the cassette changer. The two main power lines 130 and 131 are connected through fuses 132 with the terminals 133 and 134 of a terminal strip 135 which may be mounted at any convenient location such as at the back of one of the columns 11, and from these terminals lines 136 and 137 lead to terminals 138 and 139 on the terminal strip 48. A line 140 connects the terminal 138 with the terminal 141 of the push button switch 95, and a line 142 runs from terminal 138 through the primary coil 110 of motor 101 to the terminal 143 of switch 112. This terminal 143 is connected through switch arm 114 in its normal position with a line 144 to the terminal 145 of switch 111, and the switch arm 113 of switch 111 is connected through line 146 leading to the power terminal 139. Thus when both the switch arms 113 and 114 are in their normal positions, a circuit will be completed through the primary coil 110 of motor 101 to operate the motor in the proper direction in accordance with the position of the switches 120 and 121.

The switches 111 and 112 have terminals 148 and 149 connected with a common line 150 leading through the energizing coil 87 of trip magnet 86 to a line 151 from terminal strip 48 which connects with the switch arm 152 of the push button switch 90. In the normal position of switch arm 152, it is connected with a terminal 153 connected by lines 154 and 155 with a terminal 156 on the terminal strip 135. This circuit arrangement provides that when both the switch arms 113 and 114 are in their normal positions, the energizing circuit for the magnet 86 will be interrupted at switches 111 and 112 to prevent release of the plunger 84 irrespective of the position of the push button switch 90.

The several switches are shown in Fig. 8 in their relative positions corresponding to the position of the cassette holder 75 in Figs. 4 and 5, with the switch arm 114 in the full line position resulting from contact with the bolt 115 and with the switch arm 123 in its full line position resulting from contact with the adjacent bolt 125. When the push button switch 90 is depressed to change cassettes, the result will be to complete the energizing circuit for the coil 87, the circuit running from terminal 138 through line 140, terminal 141, switch arm 152, lines 151 and 150, terminal 149, switch arm 114, line 144, terminal 145, switch arm 113, and line 146. Energizing of the coil 87 causes plunger 84 to be raised and to release the catch plate 88, thus permitting the cassette holder to swing from right to left as viewed in Fig. 4.

As soon as the cassette holder starts to swing, the switch 121 is opened as result of movement of the switch arm 123 away from its actuating bolt 125, and similarly the switch arm 114 will be released from the bolt 115 and will return to its position shown in dotted lines in Fig. 8. As a result, both of the internal circuits of motor 101 will be open at the switches 120 and 121, preventing operation of the motor, and also the circuit through solenoid coil 87 will be interrupted at the switches 111 and 112. Thus while the cassette holder is swinging from one operative position to the other, the motor 101 will be prevented from operating, and the compensating weight 99 will accordingly remain in proper position to provide the desired off-center lead on the cassette holder assuring its full swinging stroke. Also, the immediate deenergizing of coil 87 will result in permitting the plunger 84 to drop under the urging of springs 93 into position for latching engagement with the catch plate 88 at the right-hand side of the cassette holder as viewed in Fig. 4 when the cassette holder reaches its other operative position.

As soon as the cassette holder reaches its other operative position, as indicated in Fig. 6, the switch arm 122 will be urged by its actuating bolt 125 to the dotted line position shown in Fig. 8 to complete the circuits of the motor 101 for clockwise rotation in Fig. 7, since the circuit through the primary coil 110 of the motor has been energized by the shifting of switch arm 114 to its dotted line position in Fig. 8. Therefore, substantially simultaneously with the arrival of the cassette holder at its other operating position, the motor 101 will start to swing the compensating weight 99 to the left as indicated in dotted lines in Fig. 7. At the same time, since this position of the parts as shown in Fig. 6, the bolt 115 is out of contact with both of switch arms 113 and 114, the circuit through coil 87 will remain interrupted until the weight 99 completes its movement and the bolt 115 contacts the switch arm 113 to shift it to the dotted line position in Fig. 8, in which position the circuit to the coil 110 will be interrupted at switch 111 to stop the motor. Thus until the weight 99 has been completely reset, release of the latch plunger 84 is prevented, and the cassette holder will remain in its left-hand position.

As already pointed out, the cassette changer is frequently used for taking stereoradiographs, with the tube head being shifted between exposures. Fig. 8 shows fragmentarily the trip magnet 160 for effecting shifting of the tube head. The switch 161 in Fig. 8 is ordinarily mounted at the tube stand or other control for remote control operation, the switch 161 serving to complete a circuit through the trip magnet 160 and the power terminals 133 and 134. Closing of switch 161 also completes the circuit through solenoid coil 87 to effect shifting of the cassette holder 75 simultaneously with the tube head, and without operating the push button switch 90. As shown, line 162 connects the switch 161 with the terminal 156 on terminal strip 135, from which the circuit to the power terminal 139 is completed through the lines 155 and 154, switch arm 152, lines 151 and 150, switch arm 114, line 144, switch arm 113 and line 146.

Fig. 8 also shows the operating circuits for the bucky and their interconnection with the circuits for the tube and cassette holder. The exposure switch for the tube is shown diagrammatically at 165 as connected between one of a pair of power lines 166 and 167 and a terminal 168 on the terminal strip 135. A line 170 leads from terminal 168 to the switch arm 69 of cutout switch 55, and when the arm 60 is in its dotted position in the operative position of the bucky casing 30 as described, the circuit will run through the switch terminal 171, the terminals 172 and 173 of plug 46 and socket 50 respectively, and the line 174 to the energizing coil of the bucky release magnet 175. A switch 176 is connected between the magnet 175 and the socket terminal 177, and the associated plug terminal 178 is connected by a line 179 with a terminal 180 on terminal strip 135, which is in turn connected to the other power line 167.

A normally open switch 185 is connected between the line 174 and the socket terminal 186, and the associated plug terminal 187 is connected by the line 188 to a terminal 189 on terminal strip 135 from which a line 190 leads to the timer 191 for the X-ray exposure, the arrangement being such that the timer will be set in operation when the circuit 185 is closed. A terminal 192 of the cutout switch 55 is also connected with line 188 to provide for short circuiting the bucky when the switch arm 60 is in full line position shown in Fig. 8.

The cable 45 provides the circuits for recocking the bucky following exposure. A line 195 leads from the power terminal 139 to the terminal 196 of plug 47, and from the associated socket terminal 197 a line 198 leads through a normally open switch 199 to the magnet 200 for recocking the bucky diaphragm. The magnet circuit is completed through the socket terminal 201, plug terminal 202 and line 203 to the power terminal 138. An additional line 205 is connected to the line 198 between switch 199 and magnet 200, and leads to the socket terminal 206. The associated plug terminal 207 is connected by a line 208 with a terminal 210 on the terminal strip 135. This terminal 210 may either be connected with the trip circuit at the control, as indicated at 212, to provide for releasing the trip magnets 86 and 160 simultaneously with the recocking magnet 200 to effect shifting of the cassette holder and tube during recocking of the bucky. If desired, terminal 210 may be connected directly to terminal 156 to operate the cassette holder independently of the tube.

These several circuits and switches are so arranged as shown that when the exposure switch 165 is operated, the circuit will be completed through the bucky trip magnet 175 to release the bucky diaphragm for its travel. The switch 176 is arranged to be released by the bucky diaphragm as it starts to move, thus interrupting the circuit through magnet 175, and simultaneously the switch 185 will be closed as a result of the movement of the diaphragm to complete the actuating circuit to the timer, thus interlocking the bucky travel with the operation of the timer. The switch 199 in the recocking circuit is positioned in the path of the bucky diaphragm in such manner as to be closed by the bucky diaphragm at the limit of its travel, thus completing the actuating circuit for the bucky recocking magnet. At the same time, closing of the switch 199 completes the circuit through line 205 to terminal 210, and this in turn completes the operating circuit through the trip magnet 160 for the X-ray tube and the trip magnet 86 for the cassette holder. As a result, the cassette holder and tube will both be released in timed relation with the completion of the exposure, so that they will shift their positions for the next picture while the bucky is being recocked.

When it is desired to operate the cassette changer without using the bucky, the casing 30 is swung into its inoperative position as described, thus releasing the switch arm 60 of the cutout switch 55 to its full line position in Fig. 8, wherein it short-circuits line 170 directly to the terminal 192 on line 188, thus providing for completing the circuit to the timer independently of the bucky when the switch 165 is closed without affecting operation of the cassette holder and compensating weight 99. In such case, the trip magnet 86 may be energized to release the cassette holder by closing either push button switch 90 or the switch 161 as desired, without requiring any adjustment or other change of the bucky circuits. Interlocked operation of the tube shift and cassette holder can also be obtained when the switch 161 is not available by connecting the terminal 210 directly to terminal 156, in which event the switch 55 should have its arm 60 taped or otherwise held in its full line position in Fig. 8 to maintain the bucky in operation for completion of the circuit through switch 185 in desired timed relation with the exposure even when the bucky is not being used for the exposure.

It will accordingly be seen that the present invention provides a cassette changer having several highly advantageous structural and operational features facilitating its use for stereoradiography. The compensating weight arrangement as described assures smooth and rapid shifting of the cassette holder between exposures in order to minimize the time interval between the taking of the two pictures of a stereoscopic pair, and the interlocking arrangement with the operating circuits for the bucky is also advantageous in facilitating speed of operation. The mounting of the bucky on the carriage is of material assistance to the operator in facilitating quick and easy movement of the bucky into and out of operating position both for purposes of loading and unloading the cassettes and also for eliminating the bucky from the line of exposure when its use is not desired without requiring its physical removal from the carriage for the complete utilization of the other parts of the changer.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A cassette changer comprising a frame providing an exposure position for the patient, a cassette holder having compartments for receiving a plurality of cassettes, pivot means mounting said cassette holder on said frame for swinging with a pendulum motion between two operative positions to align said compartments alternately with said exposure position, means for releasably holding said cassette holder in each said operative position, a casing adapted to receive a bucky, means hinging said casing to said frame for movement between an operating position aligned with said exposure position and an inoperative position, a compensating weight for said cassette holder, drive means supporting said weight for shifting movement between limit positions at either side of center with respect to said pivot means to provide an off-center load on said cassette holder assuring swinging thereof from one said operative position to the other upon release of said holding means, means operated by said bucky for releasing said holding means upon completion of an exposure, means operated by said cassette holder at each said operative position thereof for actuating said drive means and for preventing operation thereof during movement of said cassette holder, means operated by said compensating weight for preventing release of said holding means during said shifting movement of said weight, and means for releasing said holding means independently of said bucky to provide for operation of said cassette holder when said bucky casing is in said inoperative position.

2. A cassette changer comprising a frame providing an exposure position for the patient, a cassette holder having compartments for receiving a plurality of cassettes, pivot means mounting said cassette holder on said frame for swinging with a pendulum motion between two operative positions to align said compartments alternatively with said exposure position, means for releasably holding said cassette holder in each said operative position, a casing adapted to receive a bucky, means hinging said casing to said frame for movement between an operating position aligned with said exposure position and an inoperative position, a compensating weight for said cassette holder, drive means supporting said weight for shifting movement between limit positions at either side of center with respect to said pivot means to provide an off-center load on said cassette holder assuring swinging thereof from one said operative position to the other upon release of said holding means, means establishing an operating circuit for said bucky between said casing and said frame, means operated by said bucky through said circuit for releasing said holding means upon completion of an exposure, means operated by said cassette holder at each said operative position for actuating said drive means to shift said compensating weight, means responsive to movement of said casing from said operative position for interrupting said circuit when said casing is out of said operating position, and means for releasing said holding means independently of said bucky to provide for operation of said cassette holder when said casing is out of said operating position.

3. A cassette changer comprising a frame providing an exposure position for the patient, a cassette holder having compartments for receiving a plurality of cassettes, pivot means mounting said cassette holder on said frame for swinging with a pendulum motion between two operative positions to align said compartments alternately with said exposure position, means for releasably holding said cassette holder in each said operative position, a casing adapted to receive a bucky, a hollow arm hinged between said casing and said frame to support said casing for movement into and out of an operating position aligned with said exposure position, a compensating weight for said cassette holder, drive means supporting said weight for shifting movement between limit positions at either side of center with respect to said pivot means to provide an off-center load on said cassette holder, wires supported in said arm for establishing an operating circuit for said bucky between said casing and said frame, means operated by said bucky through said circuit for releasing said holding means upon completion of an exposure, means operated by said cassette holder at each said operative position thereof for actuating said drive means to shift said compensating weight, a cutout switch for interrupting said circuit, means operated by said bucky casing for operating said switch to interrupt said circuit in response to movement of said casing from said operating position, and means for releasing said holding means independently of said bucky to provide for operation of said cassette holder when said casing is out of said operating position.

4. A cassette changer comprising a frame providing an exposure position for the patient, a cassette holder having compartments for receiving a plurality of cassettes, means mounting said cassette holder on said frame for swinging with a pendulum motion between two operative positions to align said compartments alternately with said exposure position, means for releasably holding said cassette holder in each said operative position, a compensating weight carried by said mounting means and providing an off-center load on said cassette holder to assure swinging thereof from one said operative position to the other upon release of said holding means, means supporting said weight for shifting movement with respect to said cassette holder between limit positions at either side of center of said swinging mounting of said cassette holder, means on said frame operated by said weight for preventing release of said holding means during said shifting movement of said weight, and means movable with said cassette holder for preventing said shifting movement of said weight during said swinging movement of said cassette holder.

5. A cassette changer comprising a frame providing an exposure position for the patient, a cassette holder having compartments for receiving a plurality of cassettes, means mounting said cassette holder on said frame for swinging with a pendulum motion between two operative positions to align said compartments alternately with said exposure position, means for releasably holding said cassette holder in each said operative position, a compensating weight carried by said mounting means providing an off-center load on said cassette holder to assure swinging thereof from one said operative position to the other upon release of said holding means, means supporting said weight for shifting movement with respect to said cassette holder between limit positions at either side of center of said swinging mounting of said cassette holder, drive means for effecting said movement of said weight, cooperating means for actuating said drive means, said cooperating means including parts on said frame and other parts mounted for movement with said cassette holder for cooperation with said parts on said frame substantially immediately upon arrival of said cassette holder at each said operative position thereof, and means on said frame operated by said weight for preventing release of said holding means during operation of said drive means.

6. A cassette changer comprising a frame providing an exposure position for the patient, a cassette holder having compartments for receiving a plurality of cassettes, means mounting said cassette holder on said frame for swinging with a pendulum motion between two operative positions to align said compartments alternately with said exposure position, means for releasably holding said cassette holder in each said operative position, a compensating weight carried by said mounting means providing an off-center load on said cassette holder to assure swinging thereof from one said operative position to the other upon release of said holding means, means supporting said weight for shifting movement with respect to said cassette holder between limit positions at either side of center of said swinging mounting of said cassette holder, drive means for effecting said movement of said weight, cooperating means for actuating said drive means, said cooperating means including parts on said frame and other parts mounted for movement with said cassette holder for cooperation with said parts on said frame only in said operative positions of said cassette holder, means operated by said weight for preventing release of said holding means during operation of said drive means, and means operated by said weight upon arrival at each said limit position for discontinuing said drive means and preventing further operation thereof until after the next swinging movement of said cassette holder.

7. A cassette changer comprising a frame providing an exposure position for the patient, a cassette holder having compartments for receiving a plurality of cassettes, means mounting said cassette holder on said frame for swinging with a pendulum motion between two operative positions to align said compartments alternately with said exposure position, electrically operated means for releasably holding said cassette holder in each said operative position, an operating circuit for said holding means, switch means for effecting opening of said circuit to prevent release of said holding means, a compensating weight carried by said mounting means providing an off-center load on said cassette holder to assure swinging movement thereof from one said operative position to the other upon release of said holding means, drive means for shifting said weight with respect to said cassette holder between limit positions at either side of center of said swinging mounting of said cassette holder, means located on said frame for operation by said weight only in one or the other said limit position thereof to operate said switch means to effect closing of said circuit, additional switch means controlling said drive means, and means for operating said additional switch means to actuate said drive means, said additional switch means and said operating means therefor being mounted one on said frame and the other for movement with said casette holder in position for operation only in one or the other said operative position of said cassette holder.

8. A cassette changer comprising a frame providing an exposure position for the patient, a cassette holder having compartments for receiving a plurality of cassettes, an arm and pivotal mounting on said frame for supporting said cassette holder for swinging with a pendulum motion between two operative positions to align said compartments alternately with said exposure position, means releasably holding said cassette holder in each said operative position, a compensating weight for said cassette holder, means supporting said weight on said arm for shifting movement with respect to said cassette holder between limit positions at either side of center of said pivot to assure swinging of said cassette holder from one said operative position to the other upon release of said holding means, drive means for effecting said movement of said weight, cooperating switch means and operating means therefor on said arm and said frame for actuating said drive means substantially simultaneously with arrival of said cassette holder at each said operative position to effect said shifting movement of said weight substantially immediately after each said swinging movement of said cassette holder, and additional switch means and cooperating operating means therefor carried by said weight and said frame for preventing release of said holding means during movement of said weight.

9. A cassette changer comprising a frame providing an exposure position for the patient, a cassette holder having compartments for receiving a plurality of cassettes, means mounting said cassette holder on said frame for shifting movement between two operative positions to align said compartments alternately with said exposure position, a casing adapted to receive a bucky, a pair of extended arms for supporting said casing, means hinging one end of each said arm to said frame at one side of and respectively above and below said exposure position, means hinging said casing to the other ends of said arms for swinging movement with said arms between an operating position aligned with said exposure position and an inoperative position spaced laterally from said exposure position, said arms extending respectively above and below said casing and being hinged thereto at a position adjacent the opposite side of said exposure from the other ends of said arms in said operative position of said casing to provide for free access by the patient to said exposure position with said casing in said inoperative position without removing said casing from said frame.

10. A cassette changer comprising a frame providing an exposure position for the patient, a cassette holder having compartments for receiving a plurality of cassettes, means mounting said cassette holder on said frame for shifting movement between two operative positions to align said compartments alternately with said exposure position, a casing adapted to receive a bucky, an arm for supporting said casing, means hinging one end of said arm to said frame, means hinging said casing to the other end of said arm for swinging movement with said arm between an operating position aligned with said exposure position and an inoperative position spaced laterally from said exposure position to provide for free access by the patient to said exposure position without removing said casing from said frame, means establishing an electrical circuit between said casing and said frame for operating said bucky, and means responsive to movement of said casing from said operating position for interrupting said circuit to prevent operation of said bucky except when said casing is in said operating positon.

11. A cassette changer comprising a frame providing an exposure position for the patient, a cassette holder having compartments for receiving a plurality of cassettes, means mounting said cassette holder on said frame for shifting movement between two operative positions to align said compartments alternately with said exposure position, a casing adapted to receive a bucky, an arm for supporting said casing for movement between an operating position aligned with said exposure position and an inoperative position spaced laterally from said exposure position, means hinging one end of said arm to said frame adjacent one side of said exposure position, and means hinging the other end of said arm to said casing at a position adjacent the opposite side of said exposure position in said operative position of said casing to provide for outward and lateral swinging of said casing from said operating position to an inoperative position spaced laterally from said operating position.

12. A cassette changer comprising a frame providing an exposure position for the patient, a cassette holder having compartments for receiving a plurality of cassettes, means mounting said cassette holder on said frame for shifting movement between two operative positions to align said compartments alternately with said exposure position, a casing adapted to receive a bucky, an arm for supporting said casing, means hinging one end of said arm to said frame, means hinging said casing to the other end of said arm for swinging movement with said arm between an operating position aligned with said exposure position and an inoperative position spaced laterally from said exposure position to provide for free access by the patient to said exposure position without removing said casing from said frame, wires establishing an electrical circuit between said casing and said frame for operating said bucky, said arm being hollow and having said wires supported therein, and a switch mounted on said frame for interrupting said circuit in response to said movement of said casing to said inoperative position.

DAVID SUSSIN.
HADEN S. WARE.

References Cited in the file of this patent
UNITED STATES PATENTS

| Number | Name | Date |
|---|---|---|
| 1,622,320 | Kelley | Mar. 29 1927 |
| 2,060,981 | Fischer et al. | Nov. 17, 1936 |
| 2,174,738 | Eddy | Oct. 3, 1939 |
| 2,178,867 | Bader et al. | Nov. 7, 1939 |
| 2,277,330 | Kizaur | Mar. 24, 1942 |
| 2,327,603 | Kizaur | Aug. 24, 1943 |

OTHER REFERENCES

G. E. X-Ray Corp. Publication Supplement to Pub. 7B–650 "2 pages, published Aug. 1941."